US009245221B2

(12) United States Patent
Forster

(10) Patent No.: US 9,245,221 B2
(45) Date of Patent: Jan. 26, 2016

(54) RADIO FREQUENCY IDENTIFICATION SENSOR ASSEMBLY

(71) Applicant: Avery Dennison Corporation, Pasadena, CA (US)

(72) Inventor: Ian J. Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 293 days.

(21) Appl. No.: 13/719,387

(22) Filed: Dec. 19, 2012

(65) Prior Publication Data
US 2013/0162405 A1  Jun. 27, 2013

Related U.S. Application Data

(60) Provisional application No. 61/578,276, filed on Dec. 21, 2011.

(51) Int. Cl.
*G06K 19/07* (2006.01)
*H01L 51/52* (2006.01)
*G06K 19/077* (2006.01)

(52) U.S. Cl.
CPC ........ *G06K 19/0723* (2013.01); *G06K 19/0716* (2013.01); *G06K 19/0717* (2013.01); *G06K 19/07718* (2013.01); *H01L 51/5237* (2013.01)

(58) Field of Classification Search
CPC .................................................. G06K 19/0723
See application file for complete search history.

(56) References Cited

U.S. PATENT DOCUMENTS

| | | | |
|---|---|---|---|
| 6,296,389 B1 * | 10/2001 | Yamamoto et al. | 383/210 |
| 6,366,206 B1 | 4/2002 | Ishikawa et al. | |
| 7,612,325 B1 | 11/2009 | Watkins, Jr. et al. | |
| 7,764,183 B2 | 7/2010 | Burchell et al. | |
| 2002/0180605 A1 * | 12/2002 | Ozguz et al. | 340/573.1 |
| 2004/0026689 A1 | 2/2004 | Bernds et al. | |
| 2005/0242957 A1 * | 11/2005 | Lindsay et al. | 340/572.7 |
| 2005/0280531 A1 * | 12/2005 | Fadem et al. | 340/539.12 |
| 2006/0004272 A1 | 1/2006 | Shah et al. | |
| 2006/0214802 A1 * | 9/2006 | Posamentier | 340/572.8 |
| 2007/0090927 A1 | 4/2007 | Potyrailo et al. | |
| 2008/0048855 A1 | 2/2008 | Berger | |
| 2009/0155571 A1 * | 6/2009 | Mustonen | 428/327 |
| 2009/0257911 A1 | 10/2009 | Thomas et al. | |
| 2010/0015601 A1 * | 1/2010 | Gilmore et al. | 435/6 |
| 2010/0021993 A1 * | 1/2010 | Wang et al. | 435/286.1 |
| 2012/0144921 A1 | 6/2012 | Bradley et al. | |

FOREIGN PATENT DOCUMENTS

| | | |
|---|---|---|
| WO | 2006091631 | 8/2006 |
| WO | 2008155039 | 12/2008 |

* cited by examiner

*Primary Examiner* — Thien M Le
*Assistant Examiner* — Asifa Habib
(74) *Attorney, Agent, or Firm* — Avery Dennison Retail Information Services, LLC

(57) ABSTRACT

In accordance with one embodiment, an RFID sensor assembly comprises an RFID chip, an antenna, a sensor, a substrate, and a laminated layer. The RFID chip is in electrical communication with the antenna and the sensor. The RFID chip, antenna, and sensor are secured to the substrate. The laminated layer is arranged as to create a generally airtight pouch between the substrate and the laminate layer. The laminated layer is further arranged to facilitate a post manufacturing method for exposing the contents of the pouch to the environment surrounding the RFID sensor assembly.

25 Claims, 5 Drawing Sheets

US 9,245,221 B2

RADIO FREQUENCY IDENTIFICATION SENSOR ASSEMBLY

CROSS-REFERENCE TO RELATED APPLICATION

The present application claims the benefit of U.S. Provisional Patent Application No. 61/578,276 filed Dec. 21, 2011, which is incorporated herein by reference in its entirety.

BACKGROUND OF THE INVENTION

A conventional RFID tag can be deployed to sense environmental conditions and communicate environmental data to a nearby RFID reader. Prior to the deployment of an RFID tag for its intended purpose, the RFID tag can be stored for a long duration, inadvertently exposed to certain environmental conditions, and/or experience prolonged exposure to ambient air, all of which can affect the overall integrity of the RFID tag.

SUMMARY OF THE INVENTION

In accordance with one embodiment, an RFID sensor assembly comprises an RFID chip, an antenna, a sensor, a substrate, at least one electrical lead and a laminated layer. The RFID chip is in electrical contact with the antenna and communication with the sensor. The RFID chip, antenna, at least one electrical lead and sensor are secured to the substrate. The laminated layer is arranged as to create a generally sealed pouch between the substrate and the laminated layer. The laminated layer is further arranged to facilitate a post-manufacturing method for exposing the contents of the pouch to the environment surrounding the RFID sensor assembly.

In accordance with another embodiment, a method for storing a RFID sensor assembly includes the steps of forming a generally sealed pouch around an RFID sensor assembly, where the pouch is arranged to be selectively modified to exposing the RFID sensor assembly to the environment surrounding the RFID sensor assembly. Alternatively, the pouch or enclosure may be substantially sealed or enclosed and may or may not be airtight.

In accordance with another embodiment, a method of using an RFID sensor assembly includes storing an RFID sensory assembly with a laminated layer creating a sealed pouch for a period of time, performing a post-manufacturing process that modifies the pouch to expose the RFID sensor assembly to the environment, using the sensor to determine certain properties or conditions of the environment surrounding the sensor, and transmitting data to an RFID reader. Alternatively, the sensor may be activated by an activating reagent before being able to function. In another embodiment, the sensor is activated by an electrical current.

In accordance with another embodiment, a method of manufacturing an RFID sensor assembly includes securing an RFID chip, antenna sensor, and at least one electrical lead to a substrate and applying a laminated layer so as to secure the substrate along a seal edge, wherein the seal edge can be formed such that the seal between the laminated layer and the substrate is a hermetic seal so that that a pouch is formed that is substantially airtight.

BRIEF DESCRIPTION OF THE DRAWINGS

It is believed that certain embodiments will be better understood from the following description taken in conjunction with the accompanying drawings in which.

DETAILED DESCRIPTION OF THE INVENTION

The apparatus and methods disclosed in this document are described in detail by way of examples and with reference to FIGS. 1-10. Unless otherwise specified, like numbers in FIGS. 1-10 indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatus and methods for a radio frequency identification sensor assembly are hereinafter disclosed and described in detail with reference made to FIGS. 1-10.

Figure 1:
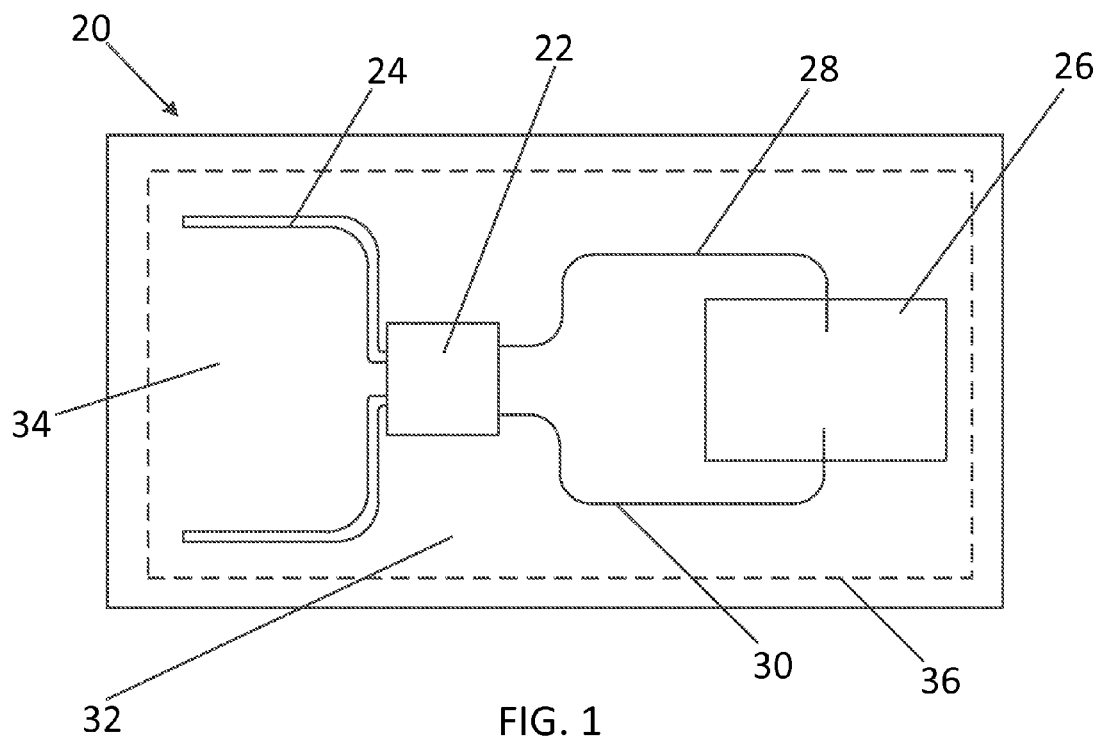
FIG. 1 is a top plan view depicting an RFID sensor assembly in accordance with one embodiment, the RFID sensor assembly includes a sensor that is enclosed in a pouch wherein the pouch is intact such that the RFID sensor assembly is in an inactive state.
Figure 2:
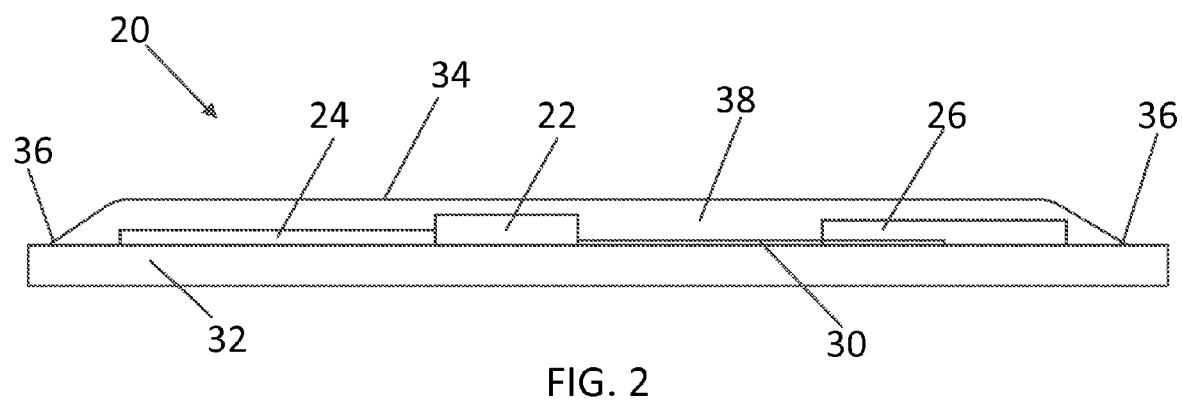
FIG. 2 is a side view of the RFID sensor assembly of FIG. 1.

As illustrated in FIGS. 1 and 2, a radio frequency identification (RFID) tag can be arranged as an RFID sensor assembly 20. The RFID sensor assembly 20 can be configured to include an RFID chip 22, an antenna 24, and a sensor 26. The RFID chip 22 can be arranged to store and/or derive information and encode such information onto a radio signal generated by or passing through the RFID chip 22. The antenna 24 can be electrically coupled with the RFID chip 22. The antenna 24 can be arranged to facilitate communication between the RFID sensor assembly 20 and remote devices such as, for example, an RFID reader or transceiver (not shown). For example, the antenna 24 can receive signals from remote devices and direct those signals to the RFID chip 22. The antenna 24 can also receive signals from the RFID chip 22 and send or transmit such signals to be received and read by remote devices.

The sensor 26 can be arranged to determine, detect, or measure certain properties or conditions of the environment surrounding the sensor 26. In one example, the sensor 26 can be arranged to determine the humidity, temperature, or atmospheric pressure of the environment surrounding the sensor 26. In another example, the sensor 26 can be arranged to determine the presence of a specific or general class of airborne chemical agents or chemicals that directly contact the sensor 26. In yet another example, the sensor 26 can be secured to an object and arranged to determine physical changes experienced in the object due to forces such as stress or strain. Although many examples provided herein describe the sensor 26 as arranged to detect the presence of a specified fluid, it will be understood that other sensors described herein or know to persons of ordinary skill in the art can be used with these many examples upon reading and understanding this disclosure.

The sensor 26 can be directly or indirectly coupled to the RFID chip 22 by a pair of electrical leads 28, 30. As will be further described, the RFID chip 22 can measure an electrical property of the sensor material, such as conductivity, dielectric constant or magnetic permeability or other electrical property useful in determining properties or conditions of the environment surrounding the sensor 26. In an alternative embodiment the sensor 26 is connected by a single lead. The RFID chip 22 can be arranged to interpret such return signals from the sensor 26 and determine an environmental condition or property sensed by the sensor 26.

The RFID chip 22, antenna 24, sensor 26, and electrical leads 28, 30 can be secured to a substrate 32. The substrate 32 can comprise a ridged or flexible material such as paper, plastic sheeting, and the like. Components can be secured to the substrate 32 through a number of methods including, for example, the use of adhesives, printing of components onto the substrate 32, and so forth. Once components are secured to the substrate 32, a lamination process can be applied to the substrate 32 such that a laminated layer 34 is formed over the substrate 32, RFID chip 22, antenna 24, sensor 26, and any other components secured to the substrate 32. The laminated layer 34 can be secured to the substrate 32 along a seal edge 36, e.g., with a heat activated seal or with adhesive, for example. As best shown in FIG. 2, the RFID chip 22, antenna 24, and sensor 26 can be positioned in a pouch 38 formed by the laminated layer 34 and the substrate 32. The seal edge 36 can be formed such that the seal between the laminated layer 34 and the substrate is a hermetic seal so that the pouch 38 is formed as an substantially or generally airtight pouch. It will be understood that components such as the RFID chip 22, antenna 24, and sensor 26 can be secured to the substrate by the lamination process. The lamination process can be facilitated by a printer and can comprise the printing of one or more layers of laminating material onto the RFID sensor assembly 20. Any number of printers can be used such as inkjet printers and thermal transfer printers.

When RFID sensor assemblies 20 are manufactured, the RFID sensor assemblies 20 can be stored in warehouses or on store shelves for an extended period of time or can be extensively handled during the shipping of the RFID sensor assemblies 20 from the manufacturing location to the deployment location. If left unprotected during such extended storage periods and during shipping, the sensors 26 or other components of the RFID sensor assemblies 20 can be subjected to damage, contamination or other such undesirable conditions that can shorten the shelf life and ultimate effectiveness and accuracy of RFID sensor assemblies 20. The pouch 38 can be arranged to provide the RFID sensor assemblies 20 protection from such undesirable conditions. For example, the pouch 38 can protect the senor 26 from exposure to damage that can render the sensor 26 unable to determine or measure the condition or property it is designed to determine or measure.

When the pouch 38 is formed and intact around the components of the RFID sensor assembly 20, the RFID sensor assembly 20 can be considered to be in an inactive state suitable for storage and/or shipping. This is to say that the pouch 38 forms a barrier between the sensor 26 and the surrounding environment. When the sensor 26 is not exposed to the environment around the RFID assembly 20, the sensor 26 cannot determine or measure humidity, the presence of chemicals, or any other desired condition or property, and thus, the RFID sensor assembly 20 is in an inactive state. The RFID sensor assembly 20 can be designed so that the sensor 26 is exposed to its surrounding environment through a post-manufacturing process that modifies the pouch 38. Such a post-manufacturing process can convert the RFID sensor assembly from an inactive state to an active state suitable for deployment and use, where the sensor 26 can determine or measure a desired environmental property or condition. Post-manufacturing processes can be performed weeks, months or even years after the manufacturing of the RFID sensor assembly 20.

Figure 3:
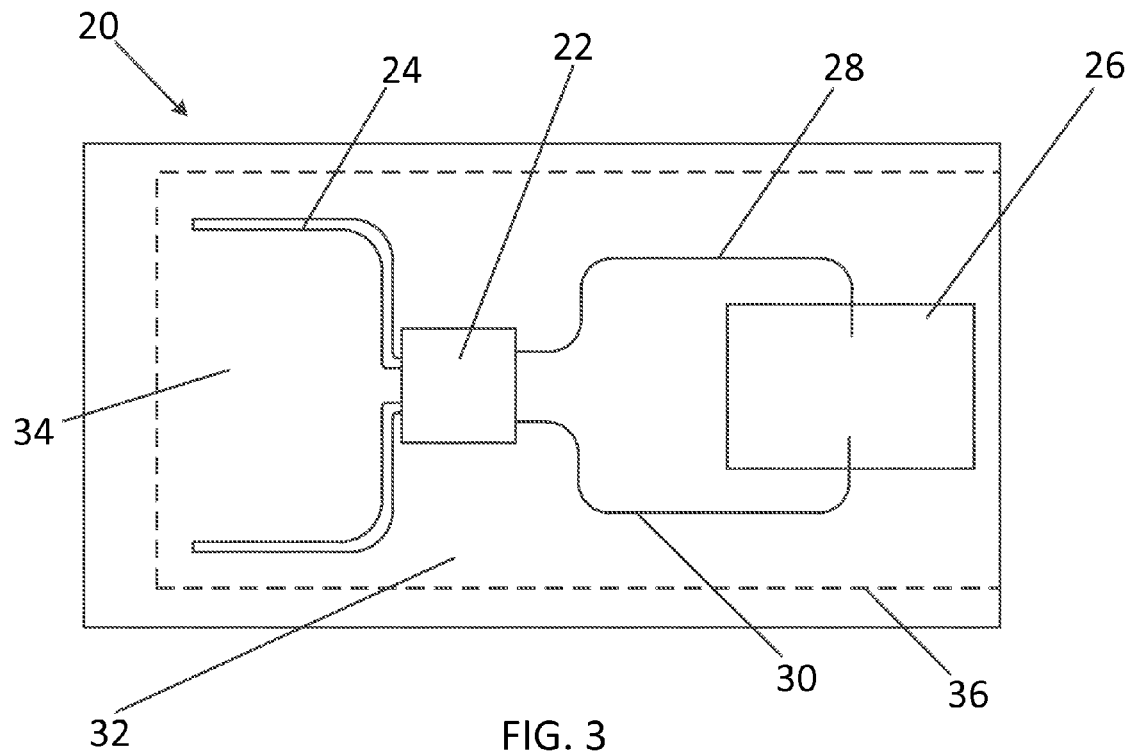
FIG. 3 is a top plan view depicting the RFID sensor of FIG. 1, but with a portion of the pouch removed to expose the sensor to its surrounding environment and place the RFID sensor assembly in an active state.
Figure 4:
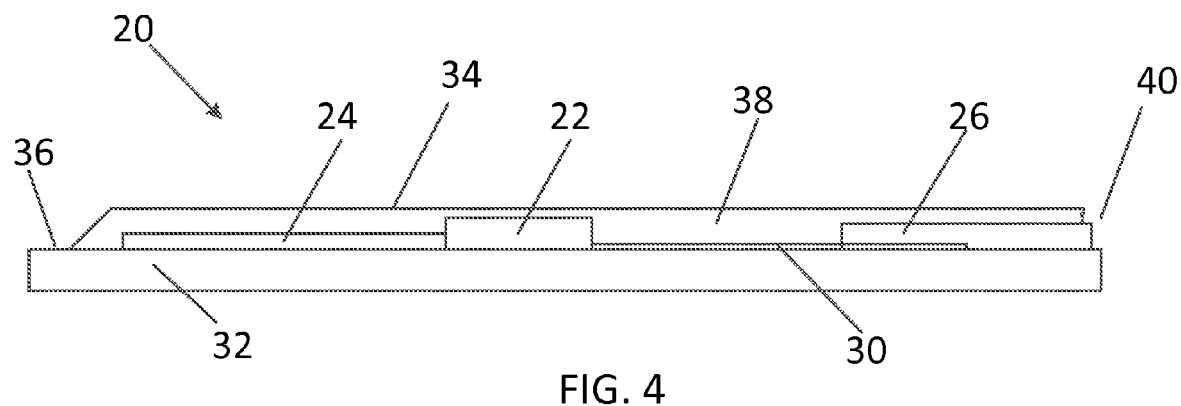
FIG. 4 is a side view of the RFID sensor assembly of FIG. 3.

One example of a post-manufacturing process is illustrated in FIGS. 3 and 4. The RFID sensor assembly 20 can be cut or trimmed near or at the seal edge 36 so as to create an opening 40 in the pouch 38 and expose the sensor 38 to its surrounding environment. Thus, converting the RFID sensor assembly 20 from an inactive state to an active state. For example, the sensor 26 can be arranged as a fluid-specific sensor. That is the RFID sensor 26 is configured to detect the presence of a specified fluid, i.e., a gas or liquid. While the RFID sensor assembly 20 is stored after its manufacture, the sensor 26 cannot sense any fluids because it is enclosed by the pouch 38. Once the RFID sensor assembly 20 is ready to be deployed for use, the pouch 38 is cut or otherwise punctured so as to expose the sensor 26 to the environment, and the sensor 26 can detect any specified fluid that is present. Once the specified fluid is detected, electrical signals or currents exchanged between the sensor 26 and the RFID chip 22 can facilitate the determination of the presence of the specified fluid. The RFID sensor assembly 20 can then make the information available to a remote system through the antenna 24 to alert nearby RFID readers of the presence and/or concentration of the specified fluid.

In one embodiment, the RFID sensor assembly 20 can be configured as a passive RFID tag that transmits a data signal through the antenna 24 in response to an interrogation signal from the RFID reader. In such an embodiment, the RFID sensor assembly 20 can be powered by the interrogation signal sent from the RFID reader. The RFID sensor assembly 20 can accordingly remain dormant until an interrogation signal is received by the antenna 24. Once the RFID sensor assembly 20 receives the interrogation signal from the RFID reader, the RFID sensor assembly 20 can power-up, determine an environmental condition or property, and transmit data back to the RFID reader regarding the environmental condition or property. The RFID reader can transmit the interrogation signal continuously, at some predetermined interval (e.g., every 10 seconds), or in response to activation by a user (e.g., through operation of a trigger).

In another embodiment, the RFID sensor assembly 20 can be configured as an active RFID tag that includes its own power source that can transmit a data signal through the antenna 24 when the RFID sensor assembly 20 is in the active state. The data signal can be transmitted continuously or at some predetermined interval (e.g., every 10 seconds). Once the RFID reader is within range of the RFID sensor assembly 20 (e.g., the data signal can effectively reach the RFID reader), data from the RFID sensor assembly 20 can be transmitted by the RFID sensor assembly 20 without requiring a bidirectional communication link between the RFID reader and the RFID sensor assembly 20. In such an embodiment, the RFID sensor assembly 20 can be powered from an on-board power source such as a battery or a supercapacitor, for example. In one embodiment, the sensor itself is an electrochemical cell, and either provides energy when the sensor is in its active state or varies a parameter, such as voltage or internal resistance, in response to the sensed material.

As will be understood, the RFID sensor assembly 20 can be configured to detect any of a variety of specified fluids and can be selected based upon a particular application. For example, the RFID sensor assembly 20 can be configured to detect relative humidity and can be attached to a shipping container to monitor for levels of relative humidity that could be harmful to the contents of the shipping container. In another example, the RFID sensor assembly 20 can be configured to detect bio-hazardous materials and can be provided as part of a public transportation system to monitor for levels of bio-hazardous materials that could affect the well-being of its passengers. In another example, the RFID sensor assembly 20 can be configured to detect air quality and can be provided as part of an environmental study to determine the overall air quality of a particular geographical location. In each example, the RFID sensor assembly 20 can be manufactured, stored for an extended period of time in an inactive state, converted to an active state by cutting or otherwise piercing the pouch 38, and the RFID sensor assembly 20 can be deployed for use in accordance with its designed purpose.

The sensor 26 can comprise an absorbent material that is treated with a detecting reagent. When the sensor 26 is exposed to the specified fluid, the specified fluid can react with the detecting reagent to change certain properties of the sensor 26 such as its conductivity (e.g., changing the overall electrical resistance of the sensor 26), color, temperature (e.g., causing the absorbent material to be exothermic), or flexibility, for example. The RFID sensor assembly 20 can sense the change to the absorbent material and can facilitate transmission of a signal from the antenna 24 that can notify the RFID reader of the presence and/or concentration of the specified fluid. It will be appreciated that when the RFID sensor assembly 20 is inactive (e.g., the pouch 38 is sealed) the sensor is less prone to being inadvertently exposed to the specified fluid. It will be appreciated that in some instances, prolonged exposure to ambient air can diminish the effectiveness of the absorbent material of the sensor 26 in sensing the specified fluid. In one embodiment, the protective pouch 38 can be vacuum sealed to reduce the adverse effect of ambient air on the sensor 26.

The RFID sensor assembly 20 can be configured such that opening the pouch 38 activates other features of the RFID sensor assembly 20. In one embodiment, opening or modifying the pouch 38 can change the transmission range of the antenna 24. With the pouch 38 intact, the antenna 24 can be operated in a short range mode such that the RFID reader can communicate with the RFID sensor assembly 20 from short distances (e.g., a few feet). When the pouch is opened, the antenna 24 can be operated in a long range mode such that the RFID reader can communicate with the RFID sensor assembly 20 from longer distances (e.g., 20-30 feet or more).

In one embodiment, the pouch 38 can be opened manually, such as by cutting the pouch 38 with any cutting instrument such as a knife. In another embodiment, the pouch 38 can be opened during an automated process such as by a printer during the printing of a label on the RFID sensor assembly 20. It will be appreciated the pouch 38 can be opened in any of a variety of suitable alternative embodiments.

The RFID chip 22, the antenna 24, and the sensor 26 can be adhered to the substrate 32 (e.g., with adhesive), deposited directly onto the substrate 32 (e.g., through a printing process), or provided on the substrate 32 in any of a variety of other suitable alternative arrangements. It will be appreciated that the substrate 32 and pouch 38 can be formed from any of a variety of materials that facilitate effective support of the RFID chip 22, the antenna 24, and the sensor 26. In one embodiment, the RFID sensor assembly 20 can include a foil substrate 32 that is in electrical communication with the antenna 24. The foil substrate can cooperate with the antenna 24 to facilitate effective propagation of a signal to and from the antenna 24.

Figure 5:
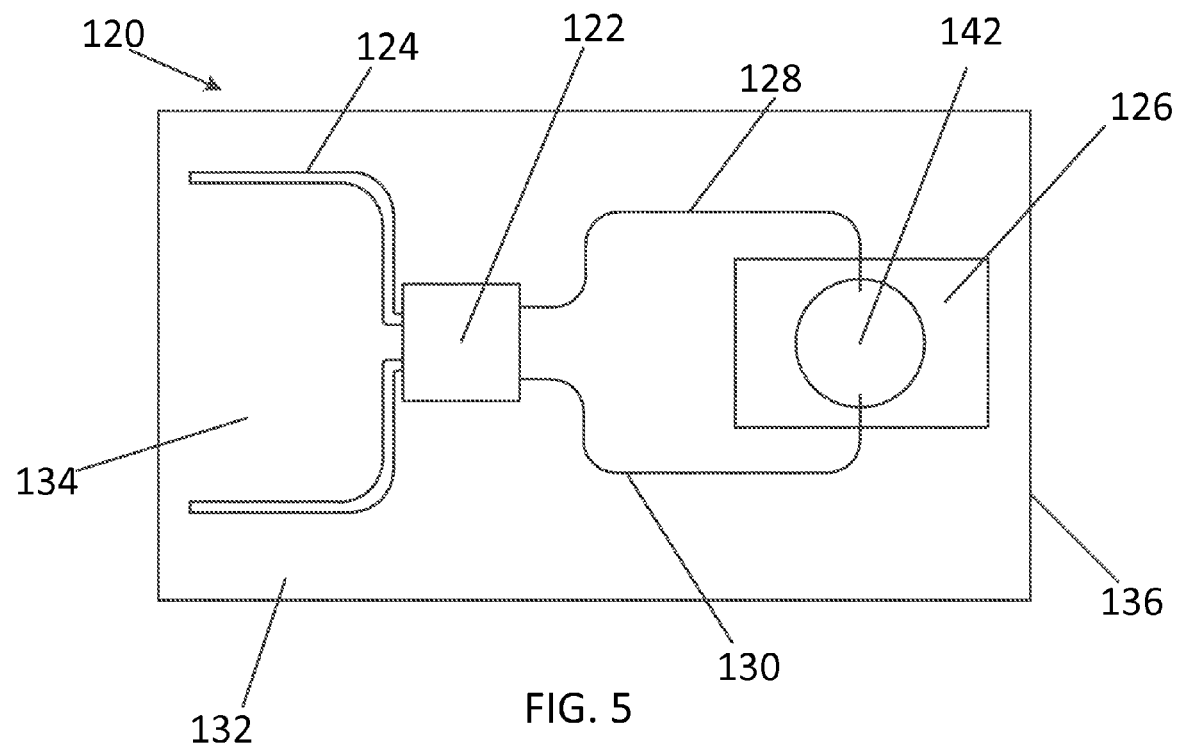
FIG. 5 is a top plan view depicting an RFID sensor assembly in accordance with another embodiment, the RFID sensor includes a sensor and a permeable membrane positioned above the sensor.
Figure 6:
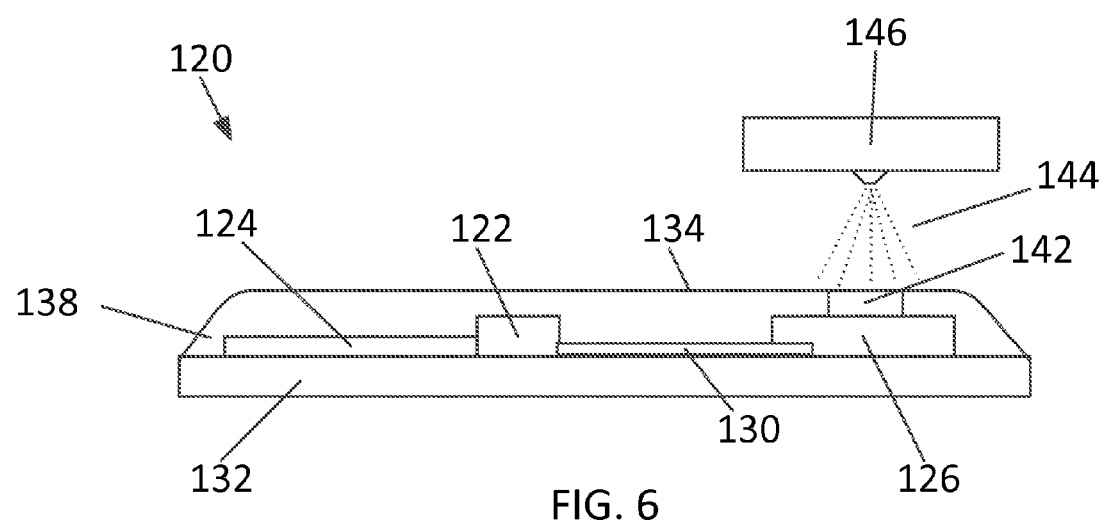
FIG. 6 is a side view depicting the RFID sensor assembly of FIG. 5, wherein an activating reagent is dispensed onto the permeable membrane by a printer.

FIGS. 5 and 6 illustrate an RFID sensor assembly 120 according to another embodiment. The RFID sensor assembly 120 can be similar to or the same as in many respects to the RFID sensor assembly 20 shown in FIGS. 1 through 4. For example, the RFID sensor assembly 120 can include an RFID chip 122, an antenna 124, and a sensor 126. The antenna 124 can be electrically coupled with the RFID chip 122 to facilitate communication with an RFID reader, and the sensor 126 can be coupled to the RFID chip 122 by a pair of electrical leads 128, 130. The sensor 120 can be configured to determine, detect or measure an environmental condition or property such as detecting the presence of a specified fluid. As best illustrated in FIG. 6, the RFID sensor assembly 120 can include a substrate 132 and a laminated layer 134 secured to the substrate 132 along a seal edge 136 to form a pouch 138.

The RFID sensor assembly 120, however, can also include a permeable membrane 142 incorporated into the laminated layer 134 and located at least above the sensor 126. The sensor 126 can be configured such that the sensor 126 can be activated by an activating reagent 144 when the activating reagent 144 comes in contact with the sensor 126, i.e., the sensor 126 is inactive until it comes into contact with the activating reagent 144. Such activation of the sensor 126 can place the RFID sensor assembly 120 into an active state such that the sensor 126 is capable of detecting the presence of a specified fluid and the RFID sensor assembly 120 can broadcast information related to the presence of the specified fluid. The permeable membrane 142 can be configured so that when an activating reagent 144 is applied to the permeable membrane 142, the activating reagent 144 passes through the permeable membrane 142 and interacts with the sensor 126 and activate the sensor 126. The permeable membrane 142 can be configured to always allow for the surrounding environment to permeate the membrane 142, or the permeable membrane 126 can be configured so that the interaction with the activating reagent 144 or other such chemical alters the membrane to allow the surrounding environment to permeate the membrane 142 and interact with the sensor 126.

In one embodiment, as illustrated by FIG. 6, the activating reagent 144 can comprise a solvent that is dispensed onto the permeable membrane 142 by an inkjet printer 146. The activating reagent 144 can be dispensed onto the permeable membrane 142 during operations such as the printing of a label onto the RFID sensor assembly 120. It will be appreciated that the sensor 126 and the activating reagent 144 can comprise any of a variety of suitable materials that can be selectively combined to activate the effective detection of a specified fluid. It will also be appreciated that the activating reagent 144 can be dispensed onto the permeable membrane 142 and thus onto the sensor 126 through any of a variety of suitable manual or automated processes.

In another embodiment, the RFID sensor assembly 120 can be manufactured without the full lamination layer 134. The lamination layer 134 may be applied to only the sensor 126, where the lamination layer 134 is a permeable material that allows the activating reagent 144 to pass through the lamination layer 134. Or the lamination layer 134 can be applied to all areas of the RFID sensor assembly 120 except the sensor 126, where a permeable layer is applied directly to the sensor 126.

Once the RFID sensor assembly 120 is placed in an active state, it can be exposed to its surrounding environment and the sensor 126 can determine or measure a parameter such as the presence of a specified fluid. Such detection can be facilitated by changes in certain properties of the sensor 126 upon interaction with the specified fluid such as conductivity (e.g., changing the overall electrical resistance), color, temperature (e.g., causing the sensor material to be exothermic), or flexibility, for example. The RFID sensor assembly 120 can sense the change to the sensor 126 due to the presence of the specified fluid and can facilitate transmission of a signal from the antenna 124 that can notify an RFID reader of the presence and/or concentration of the specified fluid.

Figure 7:
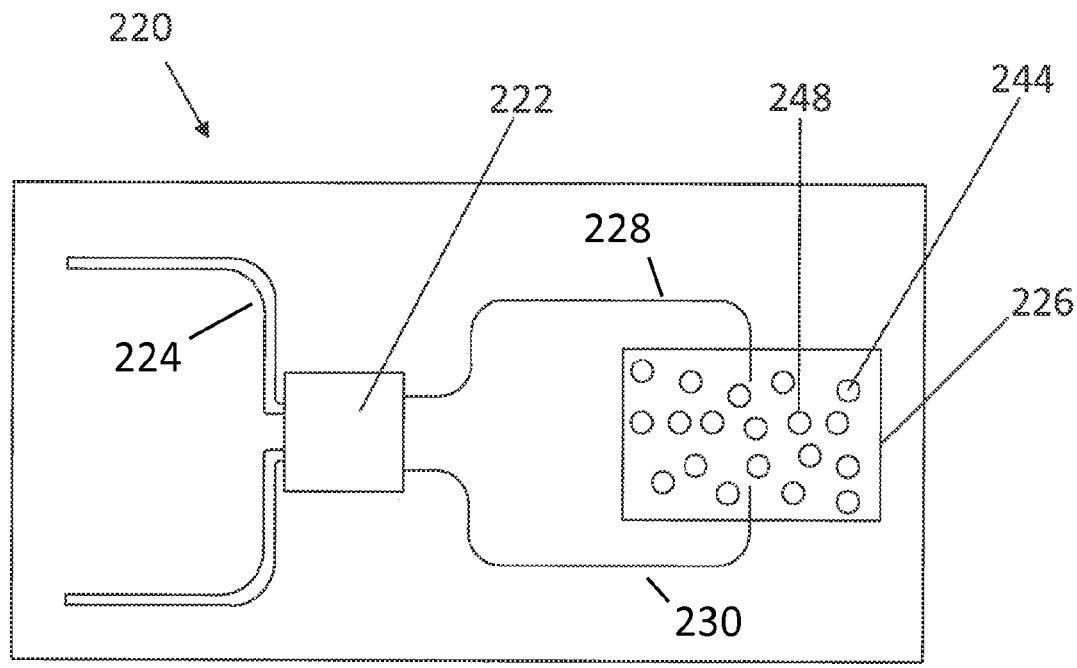
FIG. 7 is a top plan view depicting an RFID sensor assembly in accordance with yet another embodiment, the RFID sensor assembly includes a sensor and a plurality of capsules holding activating reagents suspended within the sensor.
Figure 8:
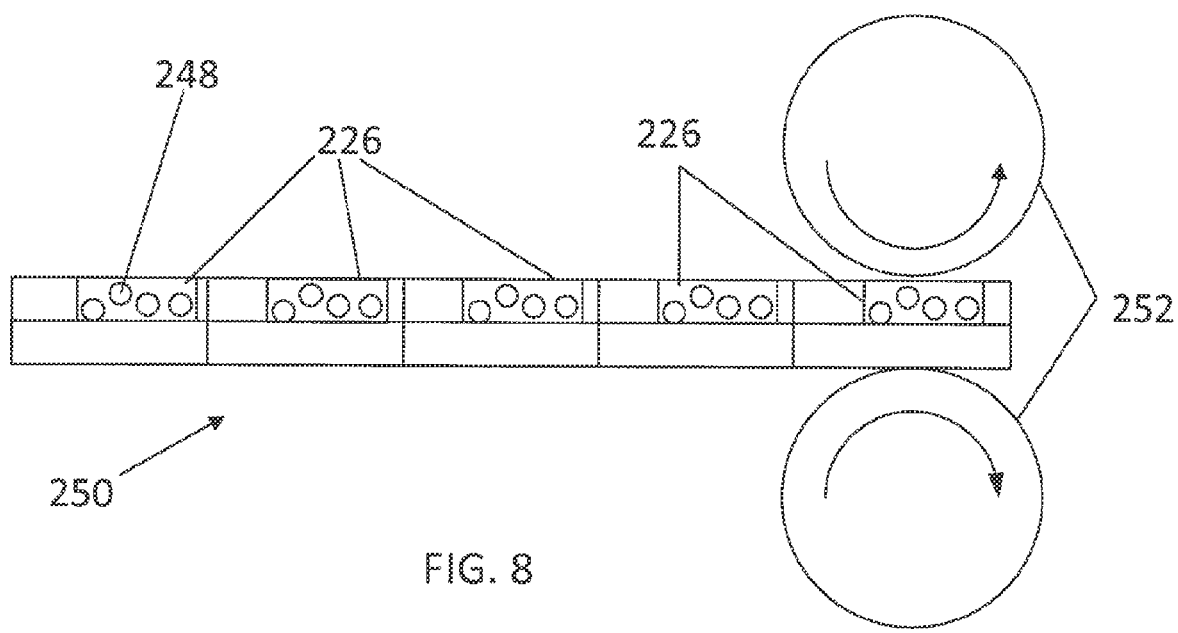
FIG. 8 is a side view depicting a plurality of RFID sensor assemblies provided as a continuous sheet, the continuous sheet of RFID sensors assemblies being moved though a pair of nip rollers.

FIGS. 7 and 8 illustrate an RFID sensor assembly 220 according to yet another embodiment. The RFID sensor assembly 220 can be similar to or the same in many respects to the RFID sensor assemblies 20, 120 previously described in FIGS. 1 through 6. For example, the RFID sensor assembly 220 can include an RFID chip 222, an antenna 224, and a sensor 226. The antenna 224 can be electrically coupled with the RFID chip 222 to facilitate communication with an RFID reader, and the sensor 226 can be coupled to the RFID chip 222 by a pair of electrical leads 228, 230. However, the RFID sensor assembly 220 illustrated in FIGS. 7 and 8 can also include a number of capsules 248 positioned proximately to the sensor 226 or embedded or suspended in the sensor 226. The capsules 248 can include a activating reagent 244 that is sealed or encapsulated within the capsules 248. The capsules 248 can be configured to break or burst upon the application of pressure or heat such that the activation reagent 244 is released from the capsules 248. When the capsules 248 burst, the activating reagent 244 is released onto or into the sensor 226. The activating reagent 244 can react with the material of the sensor 226 to activate the sensor 226 so that it can determine, detect or measure an environmental properties of conditions such as the presence of a specified fluid. It will be understood that prior to the release of the activating reagent 244, the RFID sensor assembly 220 is in an inactive state, and the release of the activating reagent 244 places the RFID sensor assembly 220 in an active state. Once the RFID sensor assembly 220 is activated, the specified fluid can change certain properties of the sensor 226 such as described above, and the RFID sensor assembly 220 can facilitate the transmission of a signal to notify the RFID reader of the presence and/or concentration of the specified fluid.

In one embodiment, as illustrated in FIG. 8, a plurality of RFID sensor assemblies 220 can be attached together to form a continuous sheet 250. The continuous sheet 250 can be fed between a pair of nip rollers 252. The nip rollers 252 can apply pressure to the RFID sensor assemblies 220 to facilitate bursting of the capsules 248. In one embodiment, the nip rollers 252 can include a notch (not shown) that aligns with the RFID chip 222 so as not to damage the RFID chip during the post-manufacturing processing. It will be appreciated that the sensor 226 and the encapsulated activating reagent 244 can comprise any of a variety of suitable materials that can be selectively combined to facilitate effective detection of a specified fluid. It will also be appreciated that the capsules 248 can be burst using any of a variety of suitable manual or automated processes. For example, the capsules can be burst by the application of pressure by the head of a printer during a printing process. It will also be appreciated that although the capsules 248 are illustrated as relatively large size, microencapsulation technologies can be applied to facilitate the embedding of activating reagents in the sensor 226.

Figure 9:
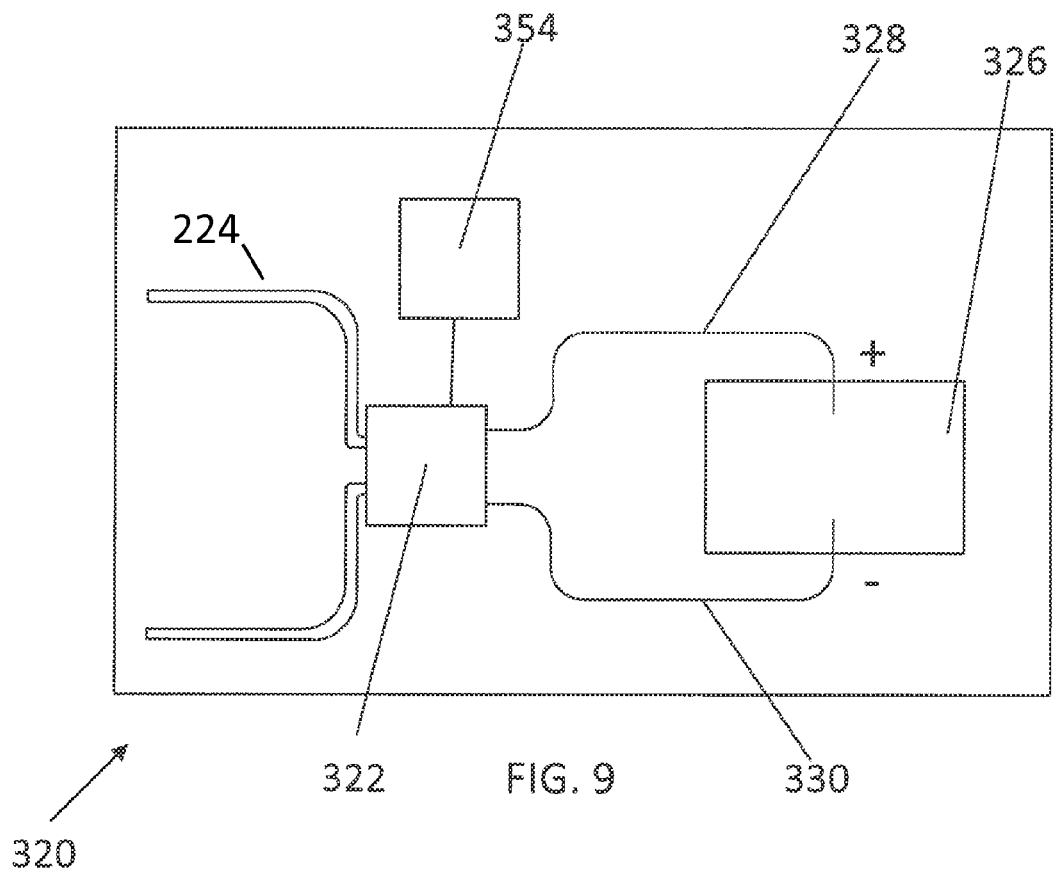
FIG. 9 is a top plan view depicting an RFID sensor assembly in accordance with yet another embodiment, the RFID sensor assembly includes an electrically activatable sensor.
Figure 10:
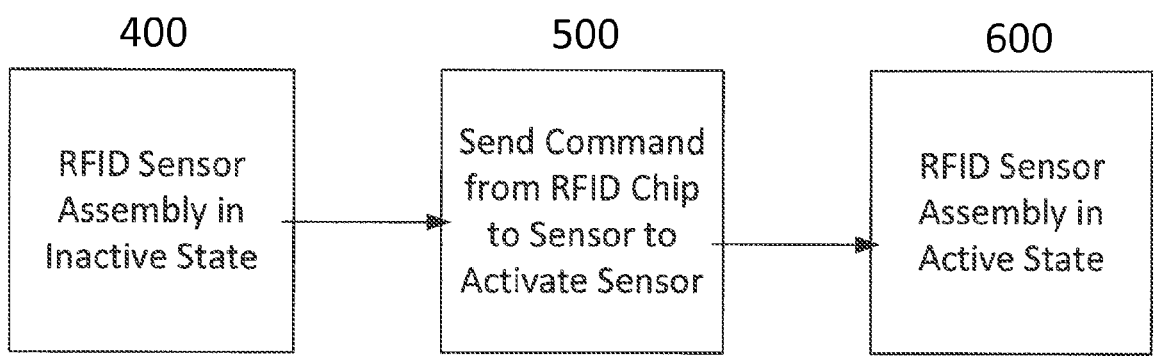
FIG. 10 is a flow chart depicting a process for converting an RFID sensor assembly from an inactive state to an active state.

FIG. 9 illustrates an RFID sensor assembly 320 according to another embodiment. The RFID sensor assembly 320 can be similar to or the same in many respects to the RFID sensor assemblies 20, 120, 220 previously described. For example, the RFID sensor assembly 320 can include an RFID chip 322, an antenna 324, and a sensor 326. The antenna 324 can be electrically coupled with the RFID chip 322 to facilitate communication with an RFID reader, and the sensor 326 can be coupled to the RFID chip 322 by a pair of electrical leads 328, 330. The RFID sensor assembly 320, however, can include a sensor 326 that is comprised of electrically activatable material. In such an embodiment, when electrical current is provided though the sensor 326 (e.g., through the electrical leads 328, 330), the RFID sensor assembly 320 is placed in an active state and the sensor 326 can, for example, detect a specified fluid. When electrical current is not being provided through the sensor 326, the sensor 326 is unable to sense any specified fluid and the RFID sensor assembly 320 is in an inactive state. One example of a flow chart for electrically activating the RFID sensor 320 is shown in FIG. 10. At step 400 the RFID sensor assembly is in an inactive state. In one embodiment, the RFID sensor assembly 320 can be activated by an interrogation signal from an RFID reader at step 500, where the RFID chip 322 relays a portion of the energy from the interrogation signal in the form of electrical current to the sensor 326 to activate the sensor 326. In another embodiment, the RFID sensor assembly 320 includes onboard power in the form of a battery 354 or other electrical storage or generation medium. The RFID sensor assembly 320 utilizes such onboard power to pass electrical current thought the sensor 326 at step 500. At step 600 the RFID sensor assembly is in an active step. It will be appreciated, however, that the sensor 326 can be electrically activated though any of a variety of suitable alternative arrangements.

It will be appreciated that additional methods of activating RFID sensor assemblies include, for example, the application of heat to melt or otherwise alter the lamination layer and expose the sensor to its surrounding environment and the application of pressure to burst the pouch to expose the sensor to its surrounding environment.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

What is claimed is:

1. A method of using an RFID sensor assembly,
providing a RFID sensor assembly including:
- a chip;
- an antenna;
- a sensor;
- at least one electrical lead;
- a laminated layer;
- a substrate;
- wherein the chip is in electrical contact with the antenna and communication with the sensor and can measure a property of a sensor material to determine the properties or conditions of the environment surrounding the sensor;
- wherein the chip, antenna, sensor, and at least one electrical lead is secured to the substrate;
- wherein the laminated layer is arranged as to create a generally sealed pouch between the substrate and the laminated layer;

storing the RFID sensor assembly for a period of time;
performing a post-manufacturing process that modifies the pouch to expose only the RFID sensor assembly to the environment while the chip, antenna, and at least one electrical lead remain within the pouch between the substrate and the laminated layer;
using the sensor to determine certain properties or conditions of the environment surrounding the sensor; and
transmitting data to an RFID reader.

2. The method of using an RFID sensor assembly of claim 1, wherein the laminated layer is only over the sensor.

3. The method of using an RFID sensor assembly of claim 1, wherein the laminated layer is formed over the substrate, RFID chip, antenna, sensor, and at least one electrical lead.

4. The method of using an RFID sensor assembly of claim 1, wherein the laminated layer is not formed over the sensor.

5. The method of using an RFID sensor assembly of claim 4, further comprising applying a permeable layer directly to the sensor.

6. The method of using an RFID sensor assembly of claim 3, wherein the pouch creates an inactive state for the RFID sensor assembly.

7. The method of using an RFID sensor assembly of claim 6, wherein the post-manufacturing process converts the RFID sensor assembly from an inactive state to an active state for deployment or use.

8. The method of using an RFID sensor assembly of claim 3, wherein the post-manufacturing process is cutting or trimming.

9. The method of using an RFID sensor assembly of claim 1, wherein the RFID chip is passive.

10. The method of using an RFID sensor assembly of claim 9, further comprising the step of powering the RFID sensor assembly by an interrogation signal sent from an RFID reader prior to the step of using the sensor to determine certain properties or conditions.

11. The method of using an RFID sensor assembly of claim 1, wherein the RFID chip is active.

12. The method of using an RFID sensor assembly of claim 1, wherein the RFID sensor is used to determine humidity.

13. The method of using an RFID sensor assembly of claim 12, further comprising a step of attaching the RFID sensor assembly to a shipping container to monitor for levels of relative humidity that could be harmful to the contents of the shipping container after the step of performing.

14. The method of using an RFID sensor assembly of claim 1, wherein the RFID sensor assembly is used to detect biohazardous materials.

15. The method of using an RFID sensor assembly of claim 14, further comprising a step of providing the RFID sensor assembly as part of a public transportation system to monitor for levels of biohazardous materials that could affect the well being of its passengers after the step of performing.

16. The method of using an RFID sensor assembly of claim 1, wherein the RFID sensor assembly is used to determine air quality.

17. The method of using an RFID sensor assembly of claim 1, wherein the RFID sensor assembly further comprises an absorbent material.

18. The method of using an RFID sensor assembly of claim 17, further comprising the step of treating the absorbent material with a detecting reagent prior to the step of storing the RFID sensor assembly.

19. The method of using an RFID sensor assembly of claim 18, wherein the sensor is used for detecting a specific fluid and the specific fluid reacts with the detecting reagent to change certain properties of the sensor.

20. The method of using an RFID assembly of claim 1, wherein modifying the pouch changes the transmission range of the antenna.

21. The method of using an RFID assembly of claim 20, wherein the RFID antenna operates in a short range mode when the pouch is intact.

22. The method of using an RFID assembly of claim 21, wherein the RFID antenna operates in long range mode after the pouch is modified.

23. The method of using an RFID assembly of claim 1, wherein the post-manufacturing process that modifies the pouch is opening it manually.

24. The method of using an RFID assembly of claim 1, wherein the post-manufacturing process that modifies the pouch is an automated process.

25. The method of using an RFID assembly of claim 24, wherein the automated process is opening by a printer during the printing of a label on the RFID sensor assembly.

* * * * *